March 22, 1932.  R. B. BEISEL  1,850,964
AEROPLANE LANDING GEAR
Filed March 4, 1927   5 Sheets-Sheet 1

INVENTOR
REX B. BEISEL.
BY *W. E. Stack Jr.*
ATTORNEY

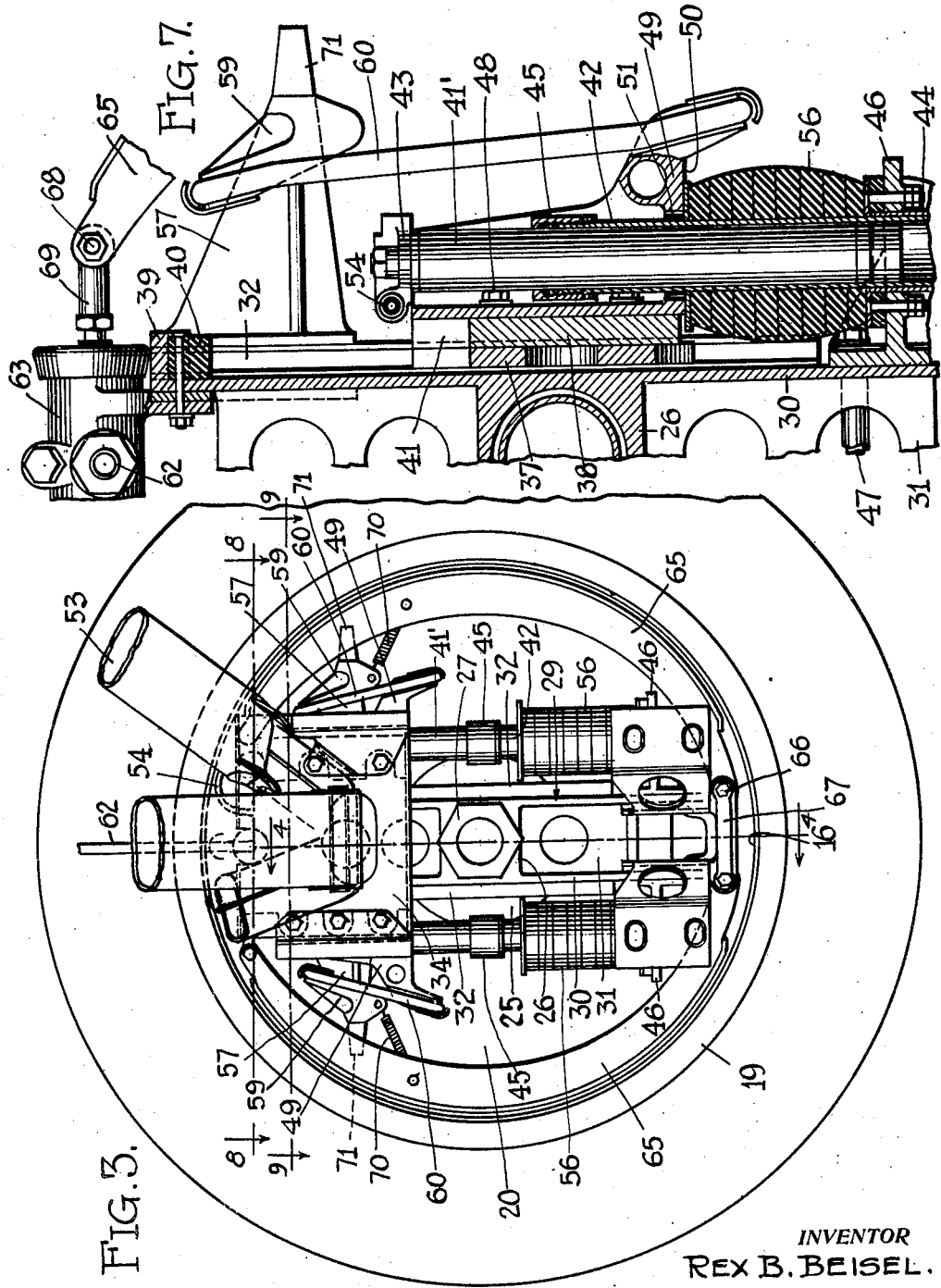

March 22, 1932.  R. B. BEISEL  1,850,964
AEROPLANE LANDING GEAR
Filed March 4, 1927  5 Sheets-Sheet 3
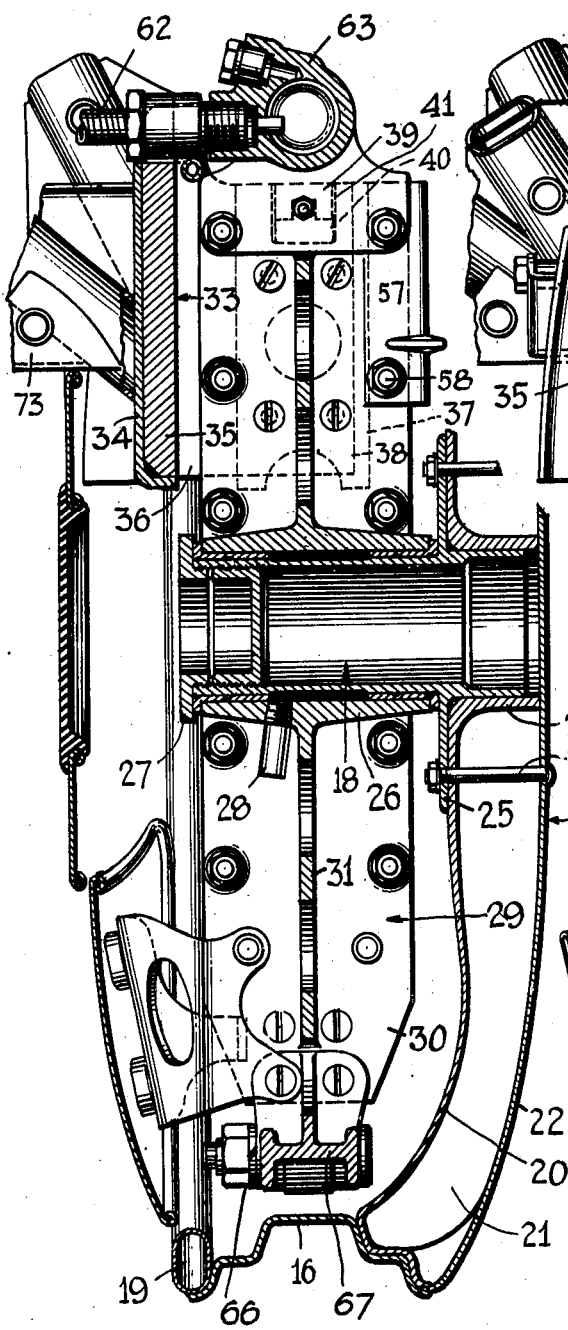
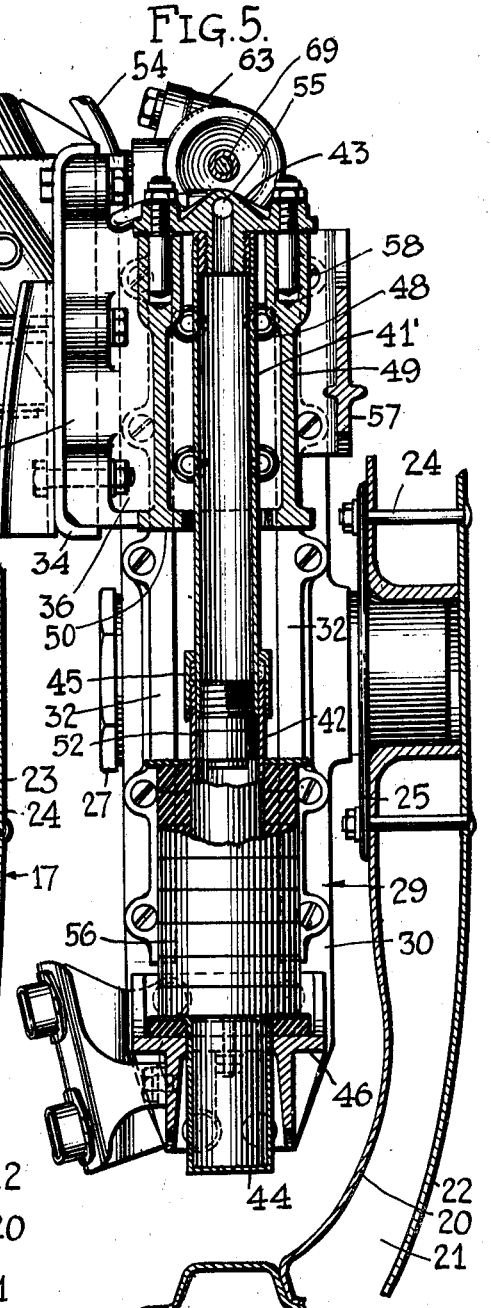
INVENTOR
REX. B. BEISEL
BY
ATTORNEY March 22, 1932. R. B. BEISEL 1,850,964
AEROPLANE LANDING GEAR
Filed March 4, 1927  5 Sheets-Sheet 4

INVENTOR
REX. B. BEISEL.
BY
ATTORNEY

March 22, 1932.  R. B. BEISEL  1,850,964
AEROPLANE LANDING GEAR
Filed March 4, 1927  5 Sheets-Sheet 5

INVENTOR
REX B. BEISEL.
BY
ATTORNEY

Patented Mar. 22, 1932

1,850,964

UNITED STATES PATENT OFFICE

REX B. BEISEL, OF EAST HEMPSTEAD, NEW YORK, ASSIGNOR TO CURTISS AEROPLANE & MOTOR COMPANY, INC., A CORPORATION OF NEW YORK

AEROPLANE LANDING GEAR

Application filed March 4, 1927. Serial No. 172,774.

My invention relates to aeroplane landing gears.

An object of the invention is to provide, in an aeroplane landing gear, a landing gear wheel in which the rim, the web and the axle portion of the wheel, are all rotatable as a unit, and in which said web portion is off-set laterally in its relation to a plane passing vertically thru the circumferential center line of said rim.

A further object of the invention is to provide a landing gear wheel in which the axle portion thereof is journaled in a non-rotatable guide along which a fitting is adapted to move up and down in response to varying impact loads encountered in the operation of the landing gear.

A further object of the invention is to provide an aeroplane landing gear in which the supporting strut or struts are fastened to and are adapted to move vertically with said fitting.

A further object of the invention is to provide an arrangement whereby said fitting, and hence the landing gear strut or struts attached thereto, in moving along said guide, are free to move back and forth, across and beyond said axle.

A further object of the invention is to provide an aeroplane landing gear in which the shock absorbing means for yieldingly restraining the movement of said strut or struts is completely enclosed within the confines of the landing gear wheel.

A further object of the invention is to provide an aeroplane landing gear in which the shock absorbing means is a combination unit embodying the fundamental characteristics of both the oleo and the compression rubber disk type shock absorber.

A further object of the invention is to provide a shock absorber comprising separate shock absorbing units, the units, in each instance, being of a duplicate construction and being disposed respectively, one each at opposite sides of said guide.

A further object of the invention is to provide an aeroplane landing gear in which, in addition to the shock absorbing means, suitable hydraulic wheel brake mechanism is also completely enclosed within the confines of the landing gear wheel.

A still further object of the invention is to provide an aeroplane landing gear in which the inner periphery of the rim of the landing gear wheel is so formed and related to the wheel brake mechanism contained therein as to constitute a brake surface against which the wheel brake or brakes, when applied, is or are adapted to frictionally bear.

Other objects and advantages of the invention will be hereinafter set forth.

In the drawings, wherein like reference characters denote like or corresponding parts, Fig. 1 is a front elevation of the landing gear;

Fig. 3 is a side elevation of that part or portion of the landing gear enclosed within the confines of one of the landing gear wheels;

Fig. 4 is an enlarged transverse vertical sectional view taken on the line 4—4 of Fig. 3;

Fig. 5 is a similar view in which the section is taken on an irregular line removed somewhat to the right of the section line 4—4 of Fig. 3;

Fig. 7 is a view similar to Fig. 6 showing the position of the landing gear parts as influenced by the application of an impact load;

Figure 1:
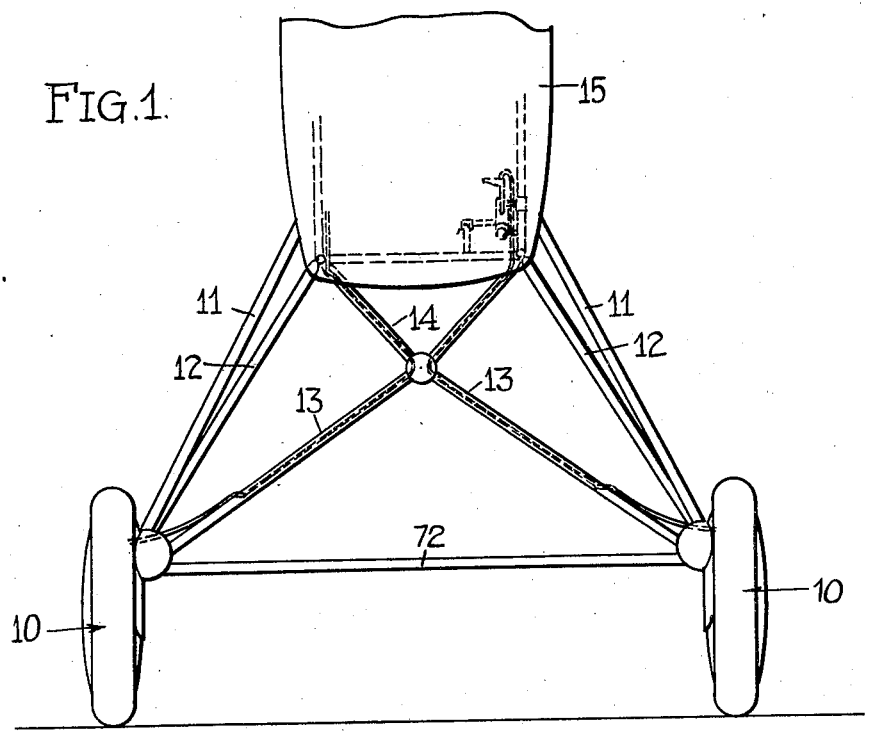
Figure 2:
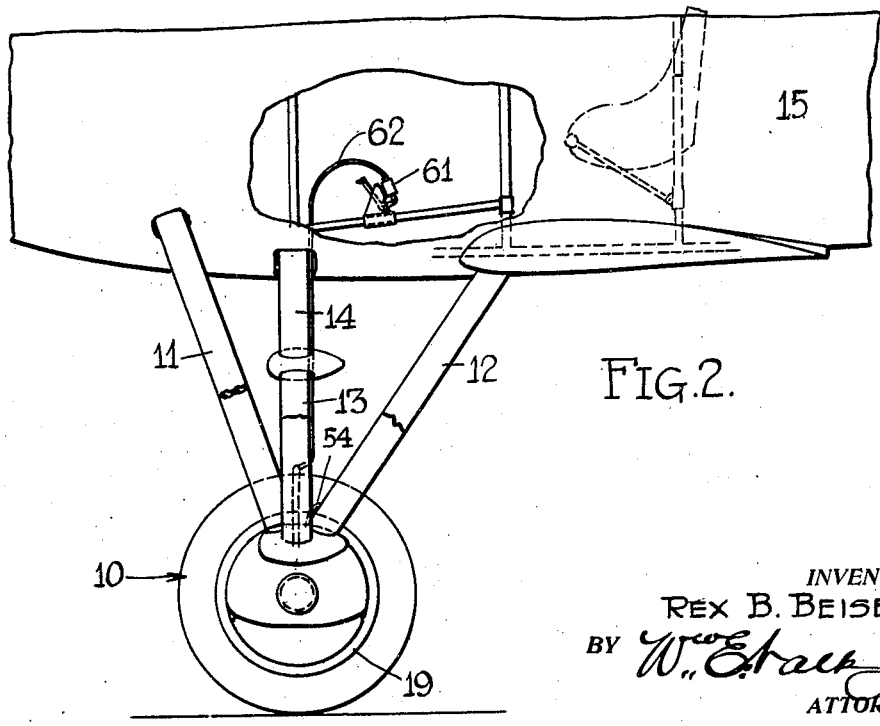
Fig. 2 is a side elevation.

In the embodiment of the invention selected for illustration, an aeroplane landing gear of somewhat more or less conventional appearance is shown. Such a landing gear comprises, in addition to the wheels 10 thereof, a plurality of landing gear struts 11, 12, 13 and 14. The struts 11, 12 and 14 of the landing gear are rigidly fastened at one end to and within the fuselage or body 15 of the machine, whereas the struts 13 are fastened to each other. The struts 14, which are convergent, support at their outer ends the struts 13, and the latter, from said point of support, diverge downwardly for connection at their opposite ends with the struts 11—12. The struts 11—12, it will be noted, are arranged, one each at opposite sides of the fuselage and are, with respect to each other, substantially V-shaped, to provide in the aggregate two downwardly divergent substantially rigid triangular landing gear frames each carrying, at its outer end, one of the landing gear wheels.

The wheels 10 of the landing gear are exactly alike. Each comprises a rim portion 16, a web portion 17 and an axle portion 18. The rim portion 16 is shaped in cross-section as best illustrated in Fig. 4. Throughout its inner margin it is circumferentially reinforced by a tubular ring 19 permanently fastened against the inner face of the inside flange of the rim. The outer or opposite rim flange, unlike the inner rim flange, has fastened thereto the web portion 17 of the wheel. Said web portion is preferably located wholly at one side of a plane passing thru the circumferential center line of the rim. It is constructed in disc form and comprises a main casting 20, radially reinforced as at 21, and a cover plate 22. The casting 20 is laterally bellied out and has formed thereon a hub portion 23 within which is snugly fitted, as by shrinking, the outer enlarged end of the axle portion 18 of the wheel. Said axle portion is hollow throughout and in addition to the snug fit in the web hub 23, it is further fastened to said web as by bolts 24 which penetrate both the casting 20 and the cover plate 22 as well as an annular flange 25 formed on said axle portion to bear directly against the inner face of the web. Throughout that portion of its length inwardly removed from said flange 25, said axle portion 18 is journaled in a bearing 26 mounted within and at the exact center of the wheel rim, and, as said journal or bearing 26 is fixed in its relation to said wheel, obviously the wheel (including the rim, web and axle portion) is freely rotatable as a unit. A nut 27 threaded into the hollow of said axle portion, and removable, serves as a means for fastening the wheel in place. To lubricate said wheel axle, a grease cup 28, threaded in the journal wall, is provided.

The bearing 26 within which the wheel 10 is journaled is preferably formed in a suitable guide 29. This guide 29 extends diametrically across and within the wheel rim and comprises spaced parallel side walls 30 and a connecting web 31. Upon each side wall 30 of the guide two guide rails 32 of channel section are fastened. Like the guide 29, the guide rails 32 extend vertically. Collectively, said rails 32 define two parallel guide-ways within which a master fitting (to be hereinafter more fully described) is slidable back and forth along said guide across and beyond the bearing 26 within which the axle portion of the wheel 10 is journaled.

Figure 9:
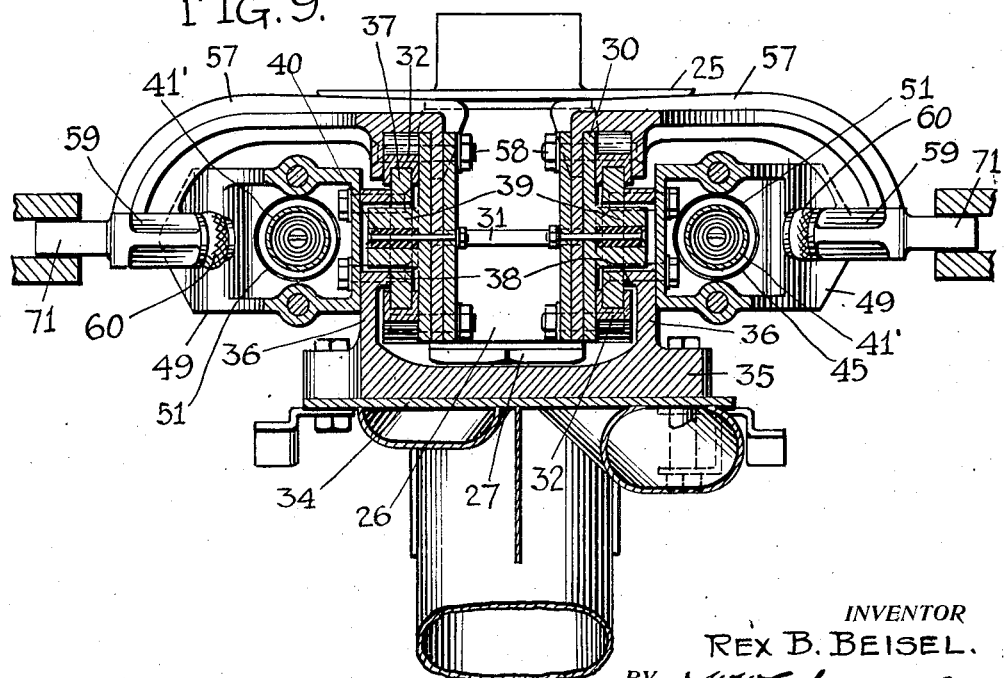
Fig. 9 is a similar view taken on the line 9—9 of Fig. 3.

The master fitting, designated in its entirety as 33, is directly fastened to a plate fitting 34 carried by the landing gear struts. Said fittings 33 and 34 and the struts 11, 12 and 13 of the landing gear, move at all times and under all operating conditions as a unit. As best illustrated in Fig. 9, the master fitting 33 comprises a flat plate-like body portion 35, arms 36, and rail engaging plates 37. The arms 36 are integrally formed on the outer face of said body portion and extend out therefrom in spaced parallel relation, one each on opposite sides of the guide 29. At their outer ends, said arms 36 have enlargements 38 formed thereon. These enlargements extend toward one another and have bolted thereto the rail engaging plates 37 which are adapted to slide vertically within the guide-ways formed by the channel rails 32. Said plates 37 moreover by their fitting engagement in the channel rails, hold the guide 29 against rotation.

As the master fitting 33 is, in the absence of either a static load or an impact load, adapted to occupy a position at the upper end of the guide 29, said guide, at its upper end, has formed thereon two oppositely extending lugs 39. These lugs 39 project laterally out from the side walls of the guide and extend into the guide-ways defined by the rails 32. Each said lug 39 has fastened thereto on its underside a re-bound shock absorber 40 against which the master fitting 33 is adapted to bear when retracted. To avoid all interference between said master fitting and said re-bound shock absorbers 40, the extensions 36 of the fitting and the plates 37 thereof are cut away as indicated at 41.

Figure 6:
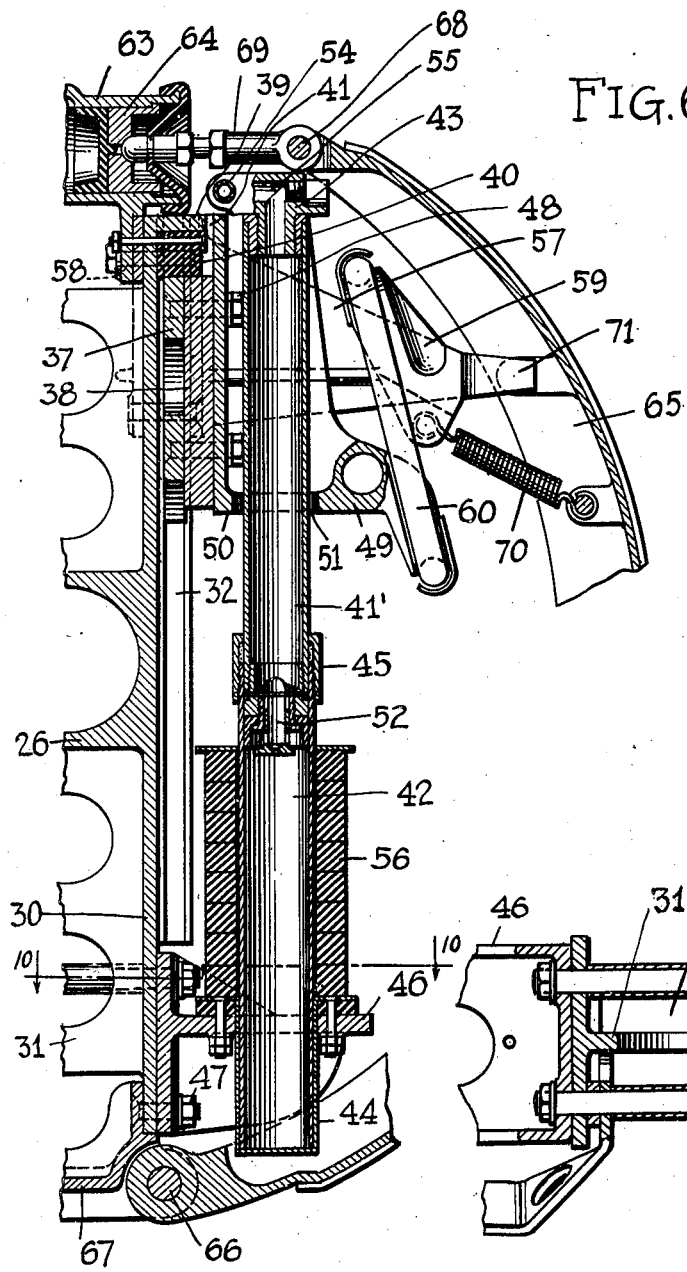
Fig. 6 is a fragmentary sectional view taken in a plane at right-angles to that of Fig. 4.
Figure 10:
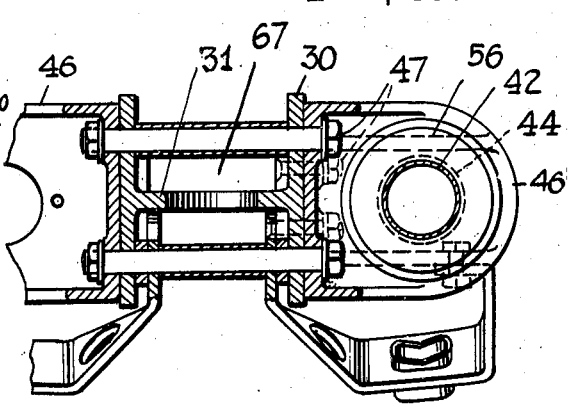
Fig. 10 is a sectional view taken on the line 10—10 of Fig. 6.

The means for resisting the sliding movement of the master fitting 33 along the guide 29 comprises, in combination, an oleo and a compression disc type shock absorber. Both said oleo means and said compression disc means are duplicated for each strut group and in each case are confined to the space within the wheel rim at opposite sides of the guide. The oleo means, in its general make-up, and except for the duplication aforesaid, is not a great deal unlike the oleo type shock absorber now used. It comprises, in duplicate, a small diameter cylinder 41', a large diameter cylinder 42, a head plate 43, and a cup-shaped member 44. The small diameter cylinders 41', in each instance, telescope within the large diameter cylinders 42, each pair, at the joint therebetween, being effectually sealed by a packing nut 45. The large diameter cylinders, at their lower ends, are flexibly supported in said cup-shaped members 44. Said cup-shaped members 44 are in turn carried by brackets 46 bolted as at 47 to the guide 29, one each at its opposite sides. These brackets are mounted at the foot of said guide and with said cup-shaped members 44 hold the large diameter cylinders in an upright or substantially vertical position and at the same time hold said large diameter cylinders in that position affording a maximum of cylinder length. The small diameter cylinders 41', instead of being fastened to the guide 29, are fastened to the head plates 43. Said head plates are, in each instance, bolted as at 48 to brackets 49 carried, one each at opposite sides of the master fitting 33. Preferably the brackets 49 (see Figs. 6 and 7) are appropriately lightened and so formed as to provide on the under-surface thereof a bearing wall 50 within which an opening 51 is formed. The small diameter cylinders, as further indicated in said figures, extend thru these openings 51 as well as throughout the length or depth of said brackets to the end that a maximum of cylinder length may be obtained within the upper portion of the wheel. The head plates 43 to which the small diameter cylinders are fastened, are mounted on the top bracket wall and are movable vertically as the cylinders telescope with said master fitting along the vertical guide 29. A check valve 52 is provided at the foot of each small diameter cylinder to govern the transfer of the oil or other fluid from one to the other of the cylinders comprising the respective pairs in the operation of the oleo means. Moreover, in view of the restricted space within which the cylinders 41' and 42 are confined, there may be provided at a remote point, an oil reservoir 53 within which the oil contained in the cylinders 41' and 42 is free to back up during the operation of said oleo means. As herein shown, such reservoir 53 is carried at or near the foot of one of the landing gear struts and is connected to both small diameter cylinders by oil lines 54 which lead respectively to ducts 55 formed in the head plates 43.

The compression disc type shock absorber, like the oleo unit, is also duplicated at opposite sides of the guide 29. It comprises essentially two tiers of rubber discs 56 arranged to encircle the large diameter cylinders of the oleo unit. Said tiers of discs bear at their lower ends directly on the brackets 46 which support the large diameter cylinders and at their opposite ends terminate at points sufficiently removed from the brackets 49 to admit of the downward movement thereof throughout a substantial portion of the length of the guide before the bottom wall 50 of said brackets is brought into bearing contact with said tiers of discs. In other words, no shock whatsoever is borne by the tiers of discs during the initial movement of the master fitting said discs being active as shock absorbing devices only after said master fitting shall have been moved sufficiently along the guide 29 to bring said brackets into bearing contact with the separate tiers of discs. From such time onward, during each successive down stroke of the master fitting, the rubber disc units and the oleo units operate jointly and in combination. In this connection it will be noted that the openings 51 formed in the bracket walls are of sufficient size to receive therewithin the large diameter cylinders and the packing nuts 45 threaded thereon when said brackets are forced downwardly in operation.

Figure 8:
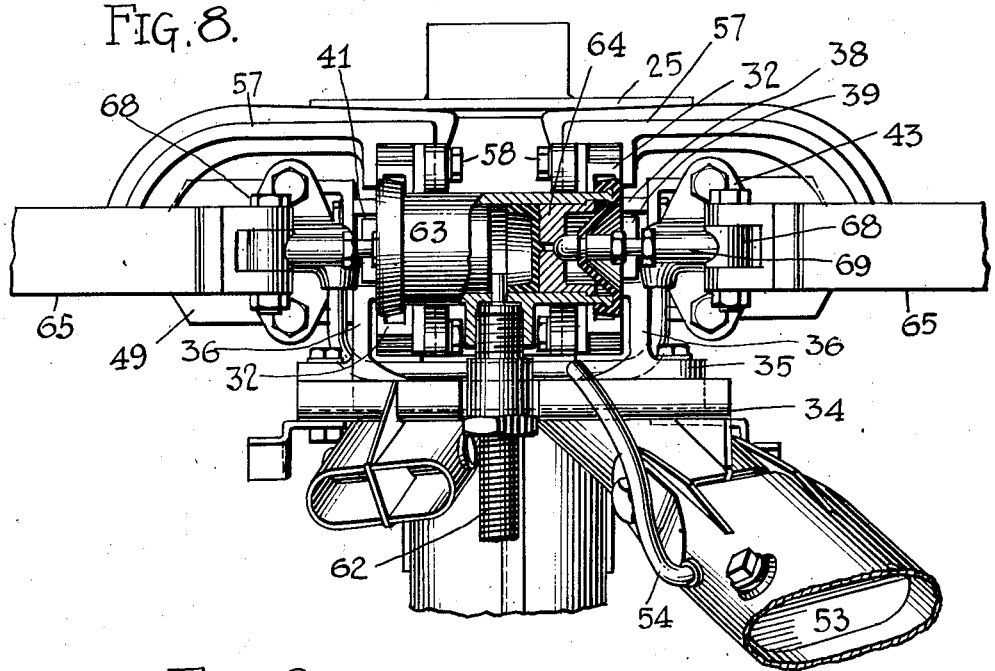
Fig. 8 is an enlarged sectional view taken on the line 8—8 of Fig. 3.

In addition to the re-bound shock absorbers 40 mounted at the upper end of the guide 29, there is provided, at said upper guide end, two duplicate yokes or frames 57. These frames 57 extend out oppositely from said guide on either side thereof. They are bolted in place as at 58 to the inside walls 34 of the guide, and from their points of attachment, reach out and around back of the guide as illustrated in Figs. 8 and 9. At their outer end said yokes 57 have formed thereon suitable head portions 59 which occupy positions so related to the brackets 49 in each instance, as to admit of the use of tension elastics as an interconnection therebetween. The function of these elastics, designated as 60, is to assist in the return movement of the master fitting 33. In the absence of said elastics 60 considerable time would be required to effect, by gravity alone, the transfer of the oil from the small diameter to the large diameter cylinders of the oleo shock absorbing means.

Referring next to the hydraulic brake mechanism of the invention, 61 designates a master cylinder of ordinary design. Preferably said cylinder 61 is located within the fuselage or body of the aeroplane in convenient proximity to the operator's seat and is connected by a feed line 62 with an operating cylinder 63. Said operating cylinder 63, as herein illustrated, is rigidly fastened to the upper end of the guide 29 and contains within its defining wall two appropriately spaced plungers or pistons 64. These pistons 64 are adapted to be simultaneously moved apart by building up within the pipe line 62, and hence the cylinder 63, a pressure sufficient to operate the brakes. The brake shoes, of which there are two, designated as 65, are wholly enclosed within the wheel rim. Each said shoe, at the foot of the guide 29, is pivoted as at 66 to a fitting 67 fastened to said guide. From their points of attachment the two shoes extend oppositely along the inner periphery of the wheel rim, each throughout substantially half the circumference of the wheel. At their opposite ends said shoes are pivotally fastened as at 68 to link connections 69 which bear at one end on the pistons 64 of the operating cylinder. Thus arranged, as the pistons 64 are forced apart, the brakes 65 are simultaneously moved into frictional contact with the inner wall of the wheel rim. By lining the brake shoes as indicated and letting the inner periphery of the wheel rim act as a brake drum or brake surface, an exceptionally simple and at the same time highly efficient hydraulic brake mechanism is evolved. Springs 70, fastened at one end to said brake shoes and at their opposite ends fastened to the yokes 57, normally hold said brake shoes out of contact with the wheel rim. Moreover, if desired, the expanding and contracting movement of said brake shoes 65 may be guided by extensions 71 formed on said yokes 57 at their outer ends.

An aeroplane landing gear characterized as above set forth is especially desirable when used on and in connection with shipboard aeroplanes. The action of the oleo shock absorbers is such that the initial or landing load is fully absorbed, and the tendency to re-bound wholly eliminated. Its desirability for shipdeck landing is in fact so pronounced that provision is made in the embodiment disclosed for the suspension of landing hooks from a cross-connection extending from one to the other of the landing gear wheels. Such connection is designated herein as 72. At its opposite ends said connection is rigidly tho removably fastened to fittings 73 carried at the foot of the divergent strut groups, which fittings, in addition to providing suitable anchorages for said cross-connection also serve as bearing surfaces against which jacks may be placed to jack-up the machine should occasion require. Moreover, as hereinbefore pointed out, my improved landing gear combined, for the first time, insofar as I am aware, the fundamental characteristics of both the oleo and the compression rubber disc types of shock absorber. Certainly, the present invention is the first instance in which a combination shock absorber of the character mentioned, together with suitable hydraulic brake mechanism, is wholly confined within the limits of the aeroplane wheels.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. A vehicle wheel comprising a fitting connected to the vehicle, a guide along which said fitting may slide, a wheel journaled in and completely enclosing said guide, a brake surface formed upon said wheel, relatively movable brake shoes mounted at one end of said guide, and hydraulic means comprising a cylinder mounted at the opposite end of said guide for simultaneously moving said brake shoes into contact with said brake surface.

2. The combination in an aeroplane landing gear of a strut fitting fastened to said aeroplane, a guide along which said strut fitting may slide, a wheel journaled in and completely enclosing said guide, a brake surface formed upon the inner surface and substantially circumferentially of said wheel, relatively movable brake shoes mounted within said wheel, and hydraulic means also mounted within said wheel and including a cylinder mounted at the opposite end of said guide for simultaneously moving said brake shoes into contact with said surface.

In testimony whereof I hereunto affix my signature.

REX B. BEISEL.